United States Patent [19]

Ezekoye et al.

[11] Patent Number: 4,836,974

[45] Date of Patent: Jun. 6, 1989

[54] VARIABLE LINEAR MOTION CYCLE MONITORING DEVICE

[75] Inventors: L. Ike Ezekoye, Wilkinsburg; David R. Cavada, Lower Burrell, both of Pa.

[73] Assignee: Westinghouse Electric Corp., Pittsburgh, Pa.

[21] Appl. No.: 188,721

[22] Filed: Apr. 29, 1988

Related U.S. Application Data

[63] Continuation of Ser. No. 934,383, Nov. 24, 1986.

[51] Int. Cl.$^4$ .............................................. G21D 1/00
[52] U.S. Cl. .................................... 376/258; 116/277; 137/553; 376/211
[58] Field of Search ........................ 376/211, 245, 258; 137/551, 553; 116/277; 73/168; 74/99 R, 206

[56] References Cited

U.S. PATENT DOCUMENTS

| | | | |
|---|---|---|---|
| 817,911 | 4/1906 | Grinnell | 137/553 |
| 899,029 | 9/1908 | Connet | 137/553 |
| 3,094,872 | 6/1963 | Brown | 137/551 |
| 3,583,245 | 6/1971 | Schaefer | 74/99 R |
| 4,029,122 | 6/1977 | Jaegtnes | 137/551 |
| 4,059,960 | 11/1977 | Osborne | 116/277 |
| 4,274,438 | 6/1981 | La Coste | 137/551 |
| 4,545,406 | 10/1985 | King | 137/553 |
| 4,711,754 | 12/1987 | Bednar | 376/245 |

Primary Examiner—Deborah L. Kyle
Assistant Examiner—Richard W. Wendtland
Attorney, Agent, or Firm—D. C. Abeles

[57] ABSTRACT

A device for measuring cycles of random reciprocal motion of an object, such as a control valve which moves in discrete movements of varying length between an opened and closed position, includes a cylindrical travel translator member biased within a housing by a coil spring to maintain tension on a cable connecting the travel translator member to the object, so that the travel translator member moves in a direction corresponding to and a distance proportional to that of the object. An elastomeric wheel frictionally engages the travel translator member to rotate a shaft which operates a mechanical counter, and through a cam, a limit switch which generates pulses representative of the random cycles of the object. Rotation of the shaft is limited to that required to operate the counter and limit switch by stops so that the elastomeric wheel slips relative to the travel translator member when the object continues, either in the same movement or in successive movements, to travel in a given direction beyond the amount required to operate the counter and limit switch.

14 Claims, 4 Drawing Sheets

VARIABLE LINEAR MOTION CYCLE MONITORING DEVICE

This application is a continuation of application Ser. No. 934,383 filed Nov. 24, 1986.

BACKGROUND OF INVENTION

1. Field of the Invention

This invention is directed to apparatus for counting cycles of reciprocal movement of an object which is moveable in discrete movements of varying length in either direction between two fixed endpoints, and more particularly to such apparatus for recording the reversals of the direction of movement of a valve member which is randomly moved varying amounts in either direction between opened and closed positions.

1. Background Information

One of the factors that affect valve life is how often the valve is cycled. The more a valve is cycled the more likely some parts will be worn. For example, valve packing is sensitive to the number of cycles to which the valve is subjected. Knowledge of how many cycles the valve has experienced may be useful to maintenance personnel in predicting when to maintain the valve.

It is known to provide some valves with limit switches which generate an electrical signal indicating when the valve is in the opened and closed positions. For valves which travel from opened to closed and vice versa without stopping inbetween, such as isolation valves, it is possible to monitor operational cycles of the valve using these stem mounted limit switches to provide electronic pulses for a remote counter. It is also possible to install on such full travel valves mechanical counters to monitor the valve cycles. These possibilities are lost when one wants to know the operating cycles on valves such as control valves where the stroke is generally varying depending upon system flow requirements. In such valves, the valve member may move a fraction of the whole travel, or indeed the whole stroke, between the opened and closed positions. In addition, the valve member may move in one direction, stop and then move again in the same direction. Existing mechanical counters and limit switches actuated at the opened and closed position of a valve are ineffective for monitoring cycles of such random valve member movement since they are capable of measuring only full valve travel.

Accordingly, it is the primary object of this invention to provide apparatus for measuring random cycles of an object which moves in discrete movements of varying lengths in either direction between fixed endpoints.

It is another object of the invention to provide such apparatus which is particularly adapted to measuring random cycles of valve movement in valves where the valve member moves varying amounts in either direction between the opened and closed positions.

It is still another object of the invention to provide means for translating the movements of the object of varying length in either of two reciprocal directions into movements of constant, although adjustable length, suitable for operating cycle counting devices.

SUMMARY OF THE INVENTION

These and other objects are realized by the invention which includes apparatus for counting the reversals of direction of movement of a travel translator member which is connected to the randomly moving object. This apparatus includes an operating member movable reciprocally between preset limits, and a coupling device for coupling the operating member to the travel translator member. The coupling device causes the operating member to move in one direction to one of its limits of travel in response to movement of the travel translator member in one direction, and maintains the operating member at that limit even though the travel translator member continues to move in the first direction, either continuously or in subsequent movements. In response to movement of the travel translator member in the reciprocal direction, the coupling device effects movement of the operating member in the reciprocal direction to the other limit, and maintains it there for any additional movement of the travel translator member in that direction. Counting apparatus counts the cycles of movement of the operating member between the limits to generate an indication of the number of reversals of the movement to which the valve is subjected.

In the preferred form of the invention, the operating member is a rotatable shaft member and the coupling device is a wheel which fixedly engages the shaft member or the translator member and frictionally engages the other member, such that the wheel slips when the shaft member reaches either of the rotation limits. Preferably, the wheel is fixedly mounted on the shaft and the peripheral surface frictionally engages the travel translator member.

Rotation of the shaft between the limits is sufficient to operate a mechanical counter attached to the shaft and/or to operate, through a cam mounted on the shaft, a switch which is cycled by repeated strokes. Such a switch can provide intermittent electrical continuity for operating a remote counter. The travel translator member is preferably mounted for reciprocal movement within a housing and is connected to the moving object, such as the stem of a valve, by a tension member such as a cable. In such an arrangement, the travel translator member is biased to maintain the wire in tension. In the preferred form, the translator member is a cylinder which slides in a cylindrical chamber in a housing and is biased by a helical coil spring. The effect of gravity could also be used to generate a suitable bias where the translator member is of sufficient mass.

BRIEF DESCRIPTION OF THE DRAWINGS

A full understanding of the invention can be gained from the following description when read in conjunction with the accompanying drawings in which.

DESCRIPTION OF PREFERRED EMBODIMENT

Figure 1:
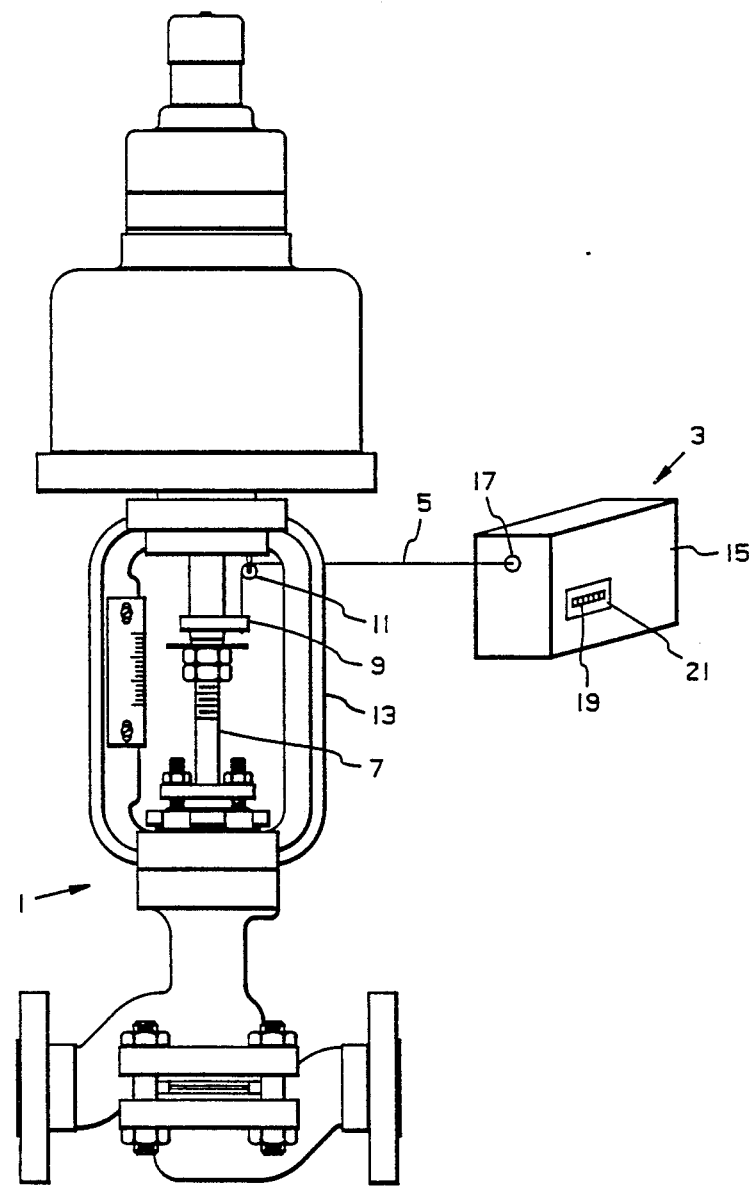
FIG. 1 is an elevation view of a valve to which apparatus according to the invention has been applied.

The invention will be described as applied to the air operated control valve 1 illustrated in FIG. 1. The cycle monitoring device 3 of the invention is remotely mounted with a cable 5 connected to the valve actuator 7 by means of a clamp 9. To translate valve motion to the monitoring device 3, a pulley 11 is mounted on the stationary valve yoke 13 such that the valve stroke is directly translated to cable extension.

The monitoring device 3 includes a box-like protective structure 15 having an aperture 17 in one end through which the cable 5 passes. A mechanical counter 19 is visible through a window 21 in the front of the device.

Figure 2:
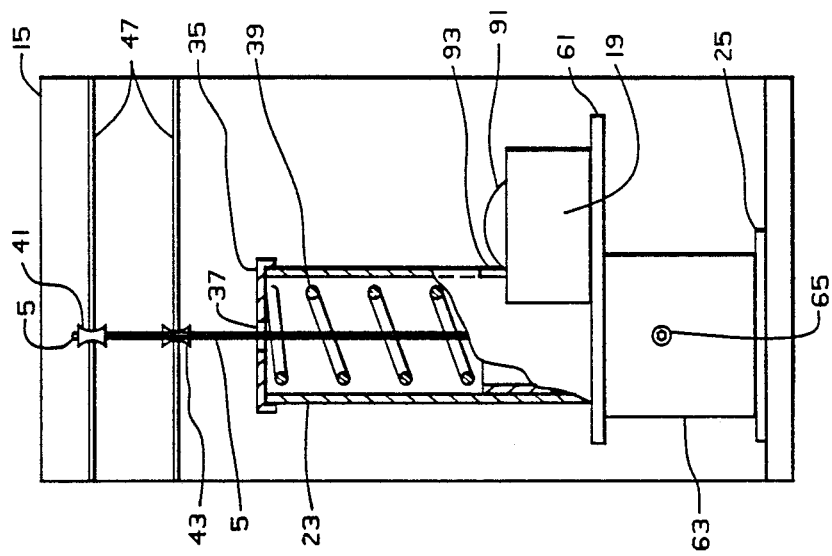
FIG. 2 is an end elevation view with some parts cut away of the apparatus of FIG. 1.
Figure 3:
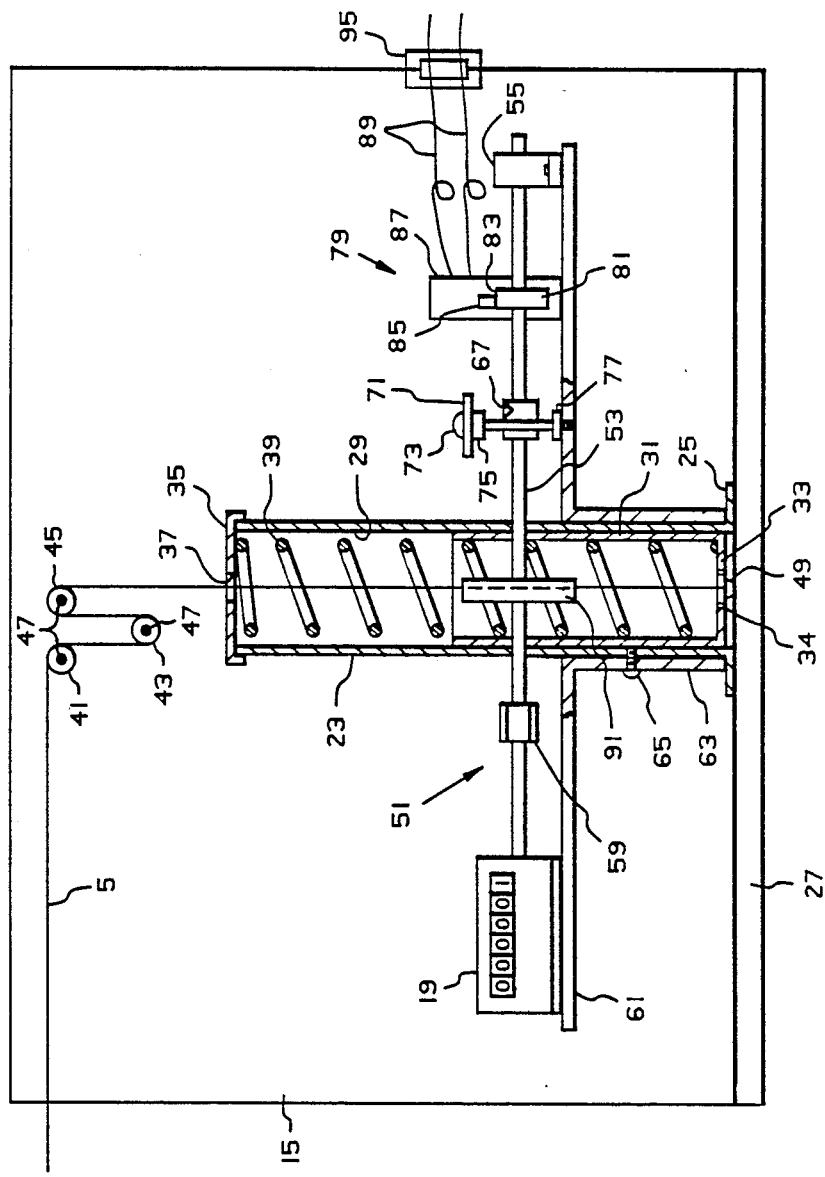
FIG. 3 is a side elevation view of the apparatus of 2, again with some parts cut away.
Figure 4:
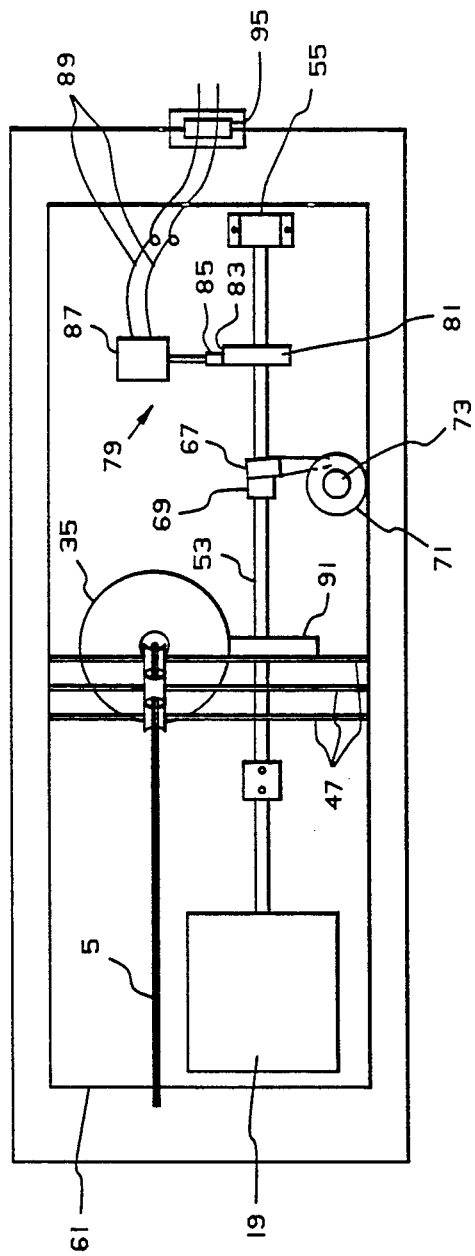
FIG. 4 is a top view of the apparatus with the top of the box enclosing the apparatus cut away.

The internal structure of the monitoring device 3 is illustrated in FIGS. 2, 3, and 4 which are an end view, a front view, and a top plan view respectively, each shown with the appropriate side of the box-like structure 15 removed. The device includes a housing 23 secured through a radial flange 25 at its lower end to the bottom 27 of the box 15. The housing 23 shown in section in FIGS. 2 and 3 defines an upright cylindrical chamber 29 in which a hollow cylindrical travel translator member 31, closed at its lower end 33, is vertically slidable. An end cap 35 having a central aperture 37 is threaded to the upper end of the housing 23. A helical compression spring 39 bears against this cap 35 to bias the travel translator member 31 toward the bottom of the chamber 29. The closed end 33 of the travel translator member 31 is provided with apertures 34 to permit air to bleed back and forth during translator motion.

The cable 5 connected to the valve operating member 7 is trained over pulleys 41, 43, and 45 mounted on shafts 47 extending across the box 15, passes through the aperture 37 in the end cap 35 and is connected to the closed end 33 of the travel translator member 31 by means of a cramped lug 49. The bias applied by the spring 39 maintains tension in the cable 5. It can be seen therefore at this point that movement of the valve operating member 7 produces corresponding movement in the travel translator member 31. The reciprocal rectilinear movement of the travel translator member 31 is in a direction corresponding to the direction of movement of the valve operator, and is of a magnitude proportional to the length of movement of the valve operator 7.

Apparatus 51 for counting the reversals in the direction of movement of the travel translator member 31 includes an operating member in the form of a shaft 53 which is mounted at one end for rotation about its axis by pillow block 55, and is connected at its other end to the mechanical counter 19 through a coupling 59. The counter 19 and pillow block 55 are supported by a bracket 61 which forms a horizontal platform. The bracket 61 is secured to the housing 23 by a depending cylindrical flange 63 and bolts 65.

Rotation of the shaft 53 is limited by a transversely extending lever 67 secured to the shaft by set screw 69. As the shaft 53 rotates in one direction, the lever 67 comes in contact with the bracket 61 which forms a stop to limit shaft rotation in the one direction. An oversized washer 71 supported above the bracket 61 by a cap screw 73 and nut 75 establishes the limit for rotation of the shaft in the opposite direction. The cap screw 73 is screwed into the bracket 61 and secure in place by a lock nut 77 so that the amount of angular rotation between limits can be adjusted by adjusting the position of the washer 71.

In addition to the mechanical counter 19, a device 79 is also provided to generate an electrical signal representative of cycles of travel of the shaft 53 between the limits of rotation. This device 79 includes a cam 81 mounted on the shaft 53 and having a camming surface 83 which engages the trip arm or plunger 85 on a limit switch 87 mounted on the bracket 61. Electrical leads 89 provide an electrical signal for local or remote counting of the strokes of the limit switch.

The shaft 53 is coupled to the travel translator member by an elastomeric wheel 91. The wheel 91 is fixed to one of the members 53 and 31 and frictionally engages the other such that rectilinear motion of the travel translator member 31 results in rotation of the shaft 53 until the lever 67 strikes one of the limits, whereupon the wheel slips relative to the member with which it is frictionally engaged. Preferably, the wheel is fixedly secured to the shaft 53 and its peripheral surface engages the travel translator member 31 through a vertical slot 93 (See FIG. 2).

FIGS. 2, 3 and 4 show the position of the travel translator member with the valve fully opened. For a closing motion of the valve, the downward motion of the valve stem 7 pulls the cable 5 which in turn lifts the travel translator member 31 against the bias of the spring 39. The upward motion of the travel translator member 31 rotates the elastomeric wheel 91 which is in direct contact with the travel translator member 31. The rotation of the wheel 91 rotates shaft 53 and thus advances the mechanical counter 19. Further rotation of the wheel in response to continued motion of the valve stem in the closing direction is prevented when lever 67 contacts the surface of bracket 61. Engagement of the lever 67 with the bracket 61 stops the rotation of the wheel so that continued motion of the travel translator member 31 results in the wheel 91 sliding on the surface of the translator 31.

A reversal of the motion of the valve stem causes the wheel 91 to rotate the shaft in the opposite direction thereby resetting the counter 19. The amount of motion during reversal is limited by the point at which the lever 67 contacts the washer 71. Continued motion of the valve stem in this opposite direction, whether in one continuous motion or through discrete movements, also results in the wheel 91 sliding with respect to the travel translator member 31. As can be seen then, it is only the initial travel in a given direction which results in rotation of the shaft 53. The rocking motion imparted to the cam 81 as the shaft 53 rotates between its limits results in the limit switch trip arm 85 engaging in and out of the profile on the cam surface 83 to provide intermittent electrical continuity for a local or remote recording by an electrical counter (not shown). Connector 95 provides access to the limit switch leads 89 for the remote indication.

It can be seen therefore that the shaft 53 rotates only during the initial movement of the travel translator member, and therefore the valve member, in a given direction. The amount of movement, however, is sufficient to operate the mechanical counter 19 and the limit switch 87. The amplitude of the cycle can be varied by adjusting the size of the elastomeric wheel 91, and/or varying the length of the gaps between the washer 71 and the surface of bracket 61.

Figure 5:
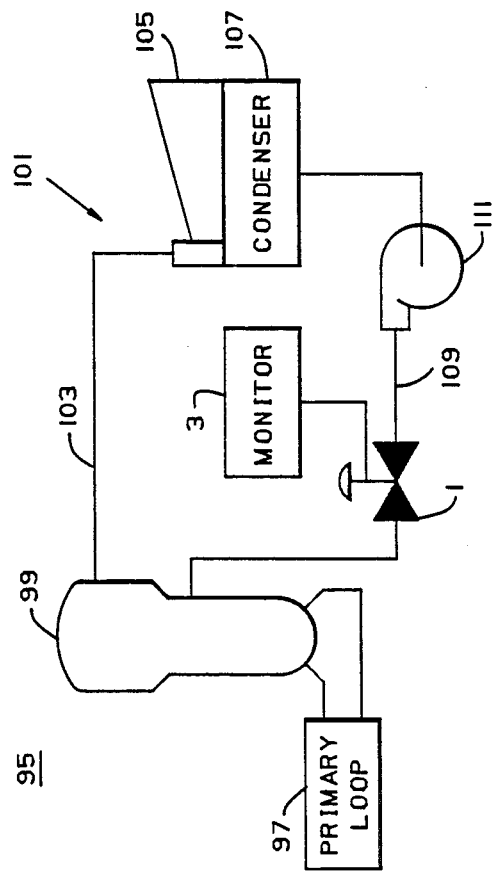
FIG. 5 is a schematic diagram of a pressurized water reactor nuclear power plant incorporating the invention.

The exemplary valve 1 is used to control feedwater flow in a pressurized water reactor (PWR) nuclear power plant. As shown in FIG. 5, the PWR plant 95 includes a primary loop 97 which incorporates a nuclear reactor (not shown). The reactor heats reactor coolant which is circulated through the primary side of a steam generator 99. The steam generator 99 utilizes the heat in the reactor coolant to generate steam which is circulated in a secondary loop 101. The steam is conducted through a steam header 103 to a steam turbine 105 which drives a generator (not shown). Vitiated steam from the turbine 105 is condensed in condenser 107 and the condensate is pumped back to the steam generator 99 as feedwater through feedwater line 109 by feedwater pump 111. The flow of feedwater to the steam generator 99 through feedwater line 109 is controlled by the feedwater flow control valve 1. With the plant 95 operating in the load follow mode, that is with plant output adjusted to meet varying electrical load conditions, the valve member of valve 1 is moved often in varying amounts in either the open or closed direction. It is very desirable to monitor the cyclic operation of the feedwater valve 1, which is a critical item in the operation of the plant, in order that preventative maintenance can be preformed on a timely basis to preclude down time. Accordingly, the monitoring device 3 is attached to the value 1 in the manner discussed above.

There are many other types of valves in a nuclear power plant and in other applications where the above described monitoring device is also useful.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. Apparatus for recording cycles of reciprocal movement of a valve member which can be moved varying amounts in discrete movements in either direction between an open and a closed position, said apparatus comprising:

a travel translator member;
   a housing for guiding said travel translator member in reciprocal rectilinear movement;
   means connecting said travel translator member to said valve member for reciprocal rectilinear movement in a direction corresponding to, and for a distance proportional to, the movement of said valve member;
   a shaft member mounted for rotation about its longitudinal axis;
   means for limiting angular rotation of said shaft member in each direction;
   means for counting cycles of reciprocal rotation of said shaft member between rotating limits set by said limiting means; and
   means for coupling said shaft member to said travel translator member for movement therewith between said limits set by said limit means and for relative therebetween as said translator member continues movement in a given direction after said shaft member reaches the limits of rotation set by said limiting means.

2. The apparatus of claim 1 wherein said coupling means comprises a wheel mounted on said shaft member and in engagement with said travel translator member; said wheel translating movement of said travel translator member into rotation of said shaft member between said limits of rotation of said shaft member set by said limit means, and means permitting relative movement between said wheel and one of said members once the limits of rotation of said shaft member are reached and the travel translator member continues movement in the same direction.

3. The apparatus of claim 2 wherein said means permitting relative movement of said wheel comprises a surface on said wheel which is in frictional engagement with said one member and slips relative thereto once said limits of rotation of said shaft member are reached.

4. The apparatus of claim 3 wherein said one member is the travel translator member and said wheel is fixed to the shaft member.

5. The apparatus of claim 4 wherein said means for counting cycles of reciprocal rotation of said shaft member includes a switch having a plunger which generates a pulse for each stroke of the plunger, and a cam member mounted on said shaft member for rotation therewith, said cam member having a camming surface which bears against said plunger to translate rotation of said shaft member between said limits into strokes of said plunger.

6. The apparatus of claim 4 wherein said means for connecting said travel translator member to said valve member comprises a tension member and wherein said apparatus includes biasing means for biasing the travel translator means relative to the housing to maintain said tension member under tension.

7. The apparatus of claim 6 wherein said housing defines a cylindrical chamber, said travel translator member comprises a cylindrical member slidable in said cylindrical chamber and said biasing means comprises a helical compression spring biasing said cylindrical member along said chamber to maintain tension on said tension member, and wherein said housing defines a slot therethrough through which said wheel extends into frictional engagement with said cylindrical member.

8. Apparatus for recording cycles of reciprocal movement of an object which is moveable in discrete movements of varying length in either direction between fixed limits, said apparatus comprising:

a travel translator member;
   means connecting the travel translator member to the object for reciprocal movement in a direction corresponding to the direction of object movement by an amount proportional to the amount of object movement; and
   means for accumulating a count of only the reversals of direction of movement of the travel translator member for all reversals of direction of said object within said fixed limits.

9. The apparatus of claim 8 wherein said means for accumulating a count of the reversals of direction of movement of said translator member comprises:

an operating member movable reciprocally between preset limits;
   means for counting cycles of movement of said operating member between said preset limits; and
   coupling means for coupling said operating member to said travel translator member to move said operating member in one direction to one of said preset limits in response to movement of said travel translator member in a first direction and to maintain said operating member at said one preset limit for any additional movement of the travel translator member in said first direction, and to move said operating member in the reciprocal direction to the other of said preset limits in response to movement of said travel translator member in a second direction and to maintain said operating member at said other preset limit for any additional movement of said travel translator member in the second direction.

10. The apparatus of claim 9 including means for guiding said travel translator member in reciprocal rectilinear movement in response to movement of the object, and wherein said operating member comprises a shaft mounted for rotation about its axis, first limit means for limiting rotation of such shaft member i one direction to effect said one preset limit, and second limit means for limiting rotation of said shaft in the other direction to effect said other limit, and wherein said coupling means comprises a wheel fixedly engaging one of said shaft member and travel translator member and frictionally engaging the other such member, such that said wheel slips relative said to other member when rotation of said shaft member is limited by said first and second limit means.

11. The apparatus of claim 10 wherein said means for counting cycles of movement of the operating member comprises an output device which provides intermittent electrical continuity with each stroke, and means for translating rotation of said shaft in a complete cycle from one limit to the other and back to the one limit into strokes of said output device.

12. The apparatus of claim 11 wherein said wheel is fixedly mounted on said shaft member for coaxial rotation therewith, and with the periphery of said wheel frictionally engaging said translator means.

13. A pressurized water reactor nuclear power plant including feedwater flow control valve having a valve member which can be moved varying amounts in discrete movements in either direction between an open and a closed position to control feedwater flow; and apparatus for recording cycles of reciprocal movement of said valve member, said apparatus comprising: a travel translator member, means connecting said travel translator member to said valve member for reciprocal rectilinear movement in a direction corresponding to, and for a distance proportional to, the movement of said valve member, a shaft member mounted for rotation about its longitudinal axis, means for limiting angular rotation of said shaft member in each direction; means for counting cycles of reciprocal rotation of said shaft member between rotating limits set by said limiting means; a wheel mounted on said shaft member and in engagement with said travel translator member said wheel translating movement of said travel translator into rotation of said shaft member between said limits of rotation of said shaft member set by said limit means, and means permitting relative movement between said wheel and one of said members once the limits of rotation of said shaft member are reached and the travel translator member continues movement in the same direction.

14. The plant of claim 13 wherein said one member is said travel translator and wherein said means permitting relative movement of said wheel comprises a surface on said wheel which is in frictional engagement with said travel translator and slips relative thereto once said limits of rotation of said shaft member are reached.

* * * * *